(12) United States Patent
Chiu

(10) Patent No.: US 10,312,720 B2
(45) Date of Patent: Jun. 4, 2019

(54) WIRELESS CHARGING SERVICE METHOD AND WIRELESS CHARGING DEVICE

(71) Applicant: Chuang-Lung Chiu, Hsinchu County (TW)

(72) Inventor: Chuang-Lung Chiu, Hsinchu County (TW)

( * ) Notice: Subject to any disclaimer, the term of this patent is extended or adjusted under 35 U.S.C. 154(b) by 0 days.

(21) Appl. No.: 15/577,933

(22) PCT Filed: May 29, 2015

(86) PCT No.: PCT/CN2015/080331
§ 371 (c)(1),
(2) Date: Nov. 29, 2017

(87) PCT Pub. No.: WO2016/191954
PCT Pub. Date: Dec. 8, 2016

(65) Prior Publication Data
US 2018/0166907 A1 Jun. 14, 2018

(51) Int. Cl.
*H02J 7/00* (2006.01)
*H02J 7/02* (2016.01)
*H01M 10/44* (2006.01)
*H02J 50/10* (2016.01)
*G06Q 30/04* (2012.01)

(52) U.S. Cl.
CPC ............. *H02J 7/025* (2013.01); *H01M 10/44* (2013.01); *H02J 50/10* (2016.02); *G06Q 30/04* (2013.01); *H01M 2220/30* (2013.01); *H02J 2007/0001* (2013.01); *H02J 2007/0096* (2013.01)

(58) Field of Classification Search
CPC ....................................................... H02J 7/025
USPC ......................................................... 320/108
See application file for complete search history.

(56) References Cited

U.S. PATENT DOCUMENTS

| | | | | |
|---|---|---|---|---|
| 2002/0062385 A1* | 5/2002 | Dowling | ............... | G06Q 20/04 709/230 |
| 2002/0128932 A1* | 9/2002 | Yung | .................... | G06Q 10/087 705/26.1 |
| 2013/0307468 A1* | 11/2013 | Lee | ........................ | H02J 7/0052 320/108 |
| 2014/0111153 A1* | 4/2014 | Kwon | .................... | H02J 7/025 320/108 |

\* cited by examiner

*Primary Examiner* — Yalkew Fantu
(74) *Attorney, Agent, or Firm* — WPAT, PC

(57) ABSTRACT

A wireless charging service method and a wireless charging device are provided. The wireless charging service method includes the following steps. Firstly, an identification device judges whether the electronic device is authenticated. If the electronic device is authenticated, the identification device issues an authority information to the electronic device. Moreover, a wireless charging device receives the authority information from the electronic device and wirelessly charges the electronic device. The task of authenticating the electronic device is related to the electronic device and the identification device only. Since the account information and the password information of the electronic device are not transmitted to the public wireless charging device, the private information will not be leaked.

7 Claims, 8 Drawing Sheets

WIRELESS CHARGING SERVICE METHOD AND WIRELESS CHARGING DEVICE

FIELD OF THE INVENTION

The present invention relates to a wireless charging service method, and more particularly to a wireless charging service method and a wireless charging device for performing a charging operation without the need of using a connecting wire.

BACKGROUND OF THE INVENTION

The commercially available electronic devices are required to be charged. In some circumstances, some electronic devices cannot be plugged into power outlets at any time. For example, portable electronic devices and electric vehicles and electric motorcycles that need to be moved at any time are required to be charged. Generally, the portable electronic device is slim and thus easily carried. The portable electronic device has a touch screen. Through the touch screen, the user may input commands to the portable electronic device and operate the portable electronic device. For example, the portable electronic device includes a smart phone, a tablet computer, a personal digital assistant (PDA), a handheld game console (e.g. PSP, NDSL and a Gameboy series game console), or the like. As mentioned above, the portable electronic device has portability. Since the portable electronic device is not connected with the power source at any time, it is necessary to install a battery in the portable electronic device to provide electricity. The battery is a chargeable battery. Consequently, the chargeable battery of the portable electronic device may be charged by the user in a place with the power socket. Moreover, because of the demands on the mileages of the electric vehicle and the electric motorcycle, the electric vehicle and the electric motorcycle have to be driven to a charging station to charge their chargeable batteries.

In case that the electricity quantity of the electronic device (including the above portable electronic device and electric vehicle) is insufficient, the chargeable battery of the electronic device is charged through a connecting wire. An end of the connecting wire is plugged into the electronic device. Another end of the connecting wire is plugged into a power source or a mobile power device that is capable of storing electric power. Consequently, the electricity provided by the power source or the mobile power device is transmitted to the electronic device through the connecting wire so as to charge the electronic device. However, the user has to carry the connecting wire in order to charge the electronic device, if necessary.

For solving the drawbacks of the above wired charging technology, a wireless charging device capable of wirelessly charging the electronic device has been introduced into the market. FIG. 1 is a schematic view illustrating a conventional wireless charging device and an electronic device. The conventional wireless charging device 10 comprises a main body 101, a power cable 102, a transmitter circuit module 103 and a transmitter coil 104. The conventional electronic device 11 comprises a casing 111, a receiver coil 112, a receiver power module 113 and a chargeable battery (not shown).

In the conventional wireless charging device 10, the power cable 102 is exposed outside the main body 101 to be connected with a power source (not shown). Both of the transmitter circuit module 103 and the transmitter coil 104 are disposed within the main body 101. The transmitter circuit module 103 is connected with the power cable 102 and the transmitter coil 104. When the transmitter circuit module 103 is driven by the power source, the transmitter circuit module 103 generates a current. The current flows through the transmitter coil 104 to result in an electromagnetic effect. On the other hand, the receiver coil 112 is disposed within the casing 111 of the conventional electronic device 11. The receiver coil 112 is used for sensing the magnetic flux from the transmitter coil 104. The receiver power module 113 is connected with the receiver coil 112 and the chargeable battery. The chargeable battery is connected with the output terminal of the receiver power module 113. The chargeable battery is used for storing electric power to be used by the electronic device. When the receiver coil 112 senses the change of the magnetic flux from the transmitter coil 104, the receiver coil 112 generates a sensing voltage in response to the change of the magnetic flux. Under the proper control of the receiver power module 113, the sensing voltage of the receiver coil 112 is converted into a required voltage level/current level for the chargeable battery in order to wirelessly charge the chargeable battery.

However, the wireless charging device 10 is not popular to the general public users. In this stage, the user has to carry the connecting wire to perform the wired charging operation when the user goes out to a specified public place. Recently, the wireless power transmission technology is gradually matured, and the demands on the wireless charging product are gradually increased. On the other hand, the user of the electronic device is desirous of the convenience of acquiring the electric power, but the electric power provider hopes that the use of the electric power is regulated to control cost or meet the commercial interests. Therefore, there is a need of providing a wireless charging service system and a wireless charging service method for facilitating the user to charge the electronic device while going out.

SUMMARY OF THE INVENTION

For solving the drawbacks of the conventional technologies, an object of the present invention provides a wireless charging service method and a wireless charging device for providing different services according to the identities and positions of the users. The service includes a charging service for an electronic device and a specified information or product service corresponding to different positions.

For solving the drawbacks of the conventional technologies, another object of the present invention provides a wireless charging service method and a wireless charging device. The positon of an electronic device is acquired according to the position of a wireless charging device.

In accordance with an aspect of the present invention, there is provided a wireless charging service method. Firstly, an electronic device receives a charging device information from a wireless charging device, and issues the charging device information and a login information to an identification device. Then, the identification device judges whether the electronic device is authenticated according to the login information. If the identification device judges that the electronic device is authenticated, the identification device issues an authority information to the electronic device. Then, a position information corresponding to the charging device information is issued from the identification device to the electronic device. Then, the wireless charging device receives the authority information from the electronic device, and performs a wireless charging operation on the electronic device.

In an embodiment, before the electronic device issues the charging device information and the login information to the identification device, the wireless charging service method further includes the following steps. A login identification information corresponding to the electronic device is stored in a database by the identification device. The charging device information corresponding to the wireless charging device is stored in the database by the identification device. The position information corresponding to a service location is stored in the database by the identification device. A connection between the charging device information and the position information is established.

Preferably, in the step of judging whether the electronic device is authenticated according to the login information, the identification device performs steps of receiving the charging device information and the logic information from the electronic device and judging whether the login information matches the login identification information. If the login information matches the login identification information, the identification device judges that the electronic device is authenticated and the identification device issues the authority information to the electronic device. Whereas, if the login information does not match the login identification information, the identification device judges that the electronic device is not authenticated and the identification device issues a login failure information to the electronic device.

Preferably, the position information contains at least one of a first product information, a first product discount information and a first customer purchase history information corresponding to a provider of the wireless charging device, a second product information, a second product discount information and a second customer purchase history information corresponding to a provider of a service location of the wireless charging device, and a third product information, a third product discount information and a third customer purchase history information corresponding to a provider of a cooperation location near the service location of the wireless charging device.

In an embodiment, while the wireless charging device receives the authority information from the electronic device and performs the wireless charging operation on the electronic device, the authority information includes at least one information selected from a quota information corresponding to a chargeable quota, a time duration information corresponding to a chargeable time and an enabling signal. The wireless charging device continuously performs the wireless charging operation on the electronic device according to the quota information. The wireless charging device continuously performs the wireless charging operation on the electronic device for a length of the chargeable time according to the time duration information. The wireless charging device continuously performs the wireless charging operation on the electronic device in response to the enabling signal.

In an embodiment, after the wireless charging device receives the authority information from the electronic device and performs the wireless charging operation on the electronic device, the wireless charging service method wireless charging service method further includes the following steps. After the wireless charging device receives the enabling signal, a wireless charging enable time is recorded. The wireless charging operation is stopped to be performed on the electronic device when the wireless charging device receives a disabling signal, and a total charge time or a total charge amount is recorded when the wireless charging operation is stopped.

In an embodiment, when the electronic device receives the charging device information from the wireless charging device, the electronic device generates a relative position and a traveling path between the electronic device and the wireless charging device according to a charging device tag and a signal strength reference value contained in the charging device information so as to provide a navigation function to the user.

In accordance with another aspect of the present invention, there is provided a wireless charging device. The wireless charging device includes a charging device identification emitter, a charging service processor and a power supply. The charging device identification emitter issues a charging device information to an electronic device. The charging service processor determines whether a charging service is provided to the electronic device according to an authority information from the electronic device. The power supply is connected with the charging service processor. When the charging service processor provides the charging service, the power supply performs a wireless charging operation on the electronic device.

In an embodiment, the charging device identification emitter issues the charging device information to the electronic device through a network connection channel, the charging service processor receives the authority information from the electronic device through the network connection channel, and the power supply performs the wireless charging operation on the electronic device through a power transmission channel.

Preferably, the network connection channel includes at least one of a Wi-Fi network, a personal area network and a wireless power sensing communication channel.

Preferably, the power transmission channel includes at least one of an electromagnetic induction wireless charging channel and an electromagnetic resonance wireless charging channel.

In an embodiment, the charging service processor controls a chargeable quota or a chargeable time corresponding to the electronic device according to the received authority information.

In an embodiment, the wireless charging device further includes a charging fee processor. The charging fee processor calculates a charge amount information according to an operation of the power supply and calculates a fee collecting information according to the charge amount information.

Preferably, the power supply includes at least one of an electromagnetic induction wireless charger and an electromagnetic resonance wireless charger.

In an embodiment, the charging device information from the charging device identification emitter further contains a charging device tag and a signal strength reference value. When the electronic device receives the charging device information, the electronic device acquires a position of the wireless charging device according to the charging device tag and acquires a relative position between the electronic device and the wireless charging device according to the signal strength reference value.

In an embodiment, the electronic device includes a receiver power module, a chargeable battery and a wireless charging management module. The receiver power module receives an electric power from the wireless charging device while the wireless charging operation is performed. The chargeable battery is connected with the receiver power module and stores the electric power. The wireless charging management module provides a login interface and an operation interface. The wireless charging management module receives a login information through the login interface and issues the login information and the charging device information to an identification device.

In an embodiment, the identification device includes a database, an authority processor and a position processor. A login identification information corresponding to the electronic device, the charging device information corresponding to the wireless charging device and a position information corresponding to a service location are stored in the database. The identification device receives the login information from the electronic device. The authority processor searches the login identification information corresponding to the electronic device from the database, judges whether the electronic device is authenticated by comparing the login information with the login identification information, and determines whether the authority information is transmitted to the electronic device according to the result of judging whether the electronic device is authenticated. When the position processor searches the position information corresponding to the service location, the position processor issues the position information to the electronic device.

In accordance with a further aspect of the present invention, there is provided a charging service module used in a wireless charging device having a power supply. The charging service module includes a charging device identification emitter and a charging service module. The charging device identification emitter issues a charging device information to an electronic device. The charging service module is connected with the power supply. According to an authority information from the electronic device, the charging service processor determines whether a charging service is provided to the electronic device. When the charging service processor provides the charging service, the charging service module controls the power supply to perform a wireless charging operation on the electronic device.

In an embodiment, the charging service module further comprises a charging fee processor, and the charging fee processor calculates a charge amount information according to an operation of the power supply and calculates a fee collecting information according to the charge amount information. Alternatively, the charging service processor controls a chargeable quota or a chargeable time for the power supply to charge the electronic device according to the received authority information.

In an embodiment, the charging device information from the charging device identification emitter further contains a charging device tag and a signal strength reference value. When the electronic device receives the charging device information, the electronic device acquires a position of the charging service module according to the charging device tag and acquires a relative position between the electronic device and the wireless charging device according to the signal strength reference value. The charging device identification emitter issues the charging device information to the electronic device through a network connection channel. The charging service processor receives the authority information from the electronic device through the network connection channel.

From the above descriptions, the present invention provides a wireless charging service method. The task of authenticating the electronic device is performed through the identification device in the network. Consequently, the structure of the wireless charging device is simplified. In other words, the wireless charging device is only responsible for the wireless charging task, and the wireless charging device does not need to perform the task of authenticating the electronic device. The task of authenticating the electronic device is related to the electronic device and the identification device only. Since the account information, the password information and associated private information of the electronic device are not transmitted to the public wireless charging device, the private information will not be leaked. Moreover, after the electronic device receives the charging device information from the wireless charging device, the electronic device issues the account information, the password information and the charging device information to the identification device and the identification device judges whether the electronic device is authenticated. Consequently, the identification device realizes the position of the electronic device according to the charging device information. The identification device can issue the authority information to the electronic device to request the wireless charging device to perform different types of charging services. Moreover, the position information corresponding to the service location (e.g., the coupons or the product discount information) is transmitted from the identification device to the electronic device. Consequently, the publicizing and marketing efficacy is enhanced.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

Figure 1:
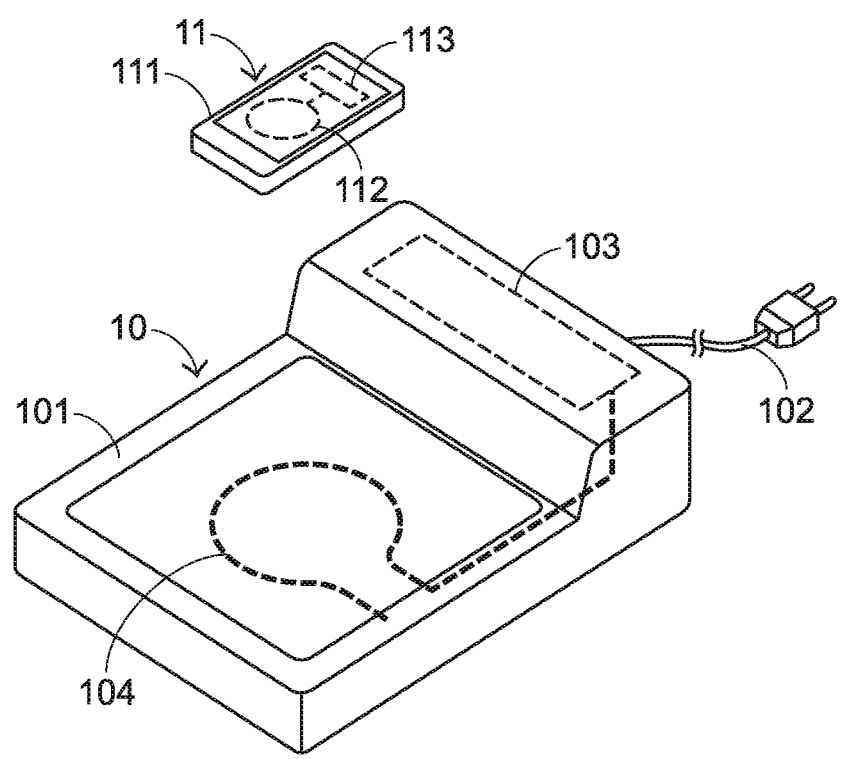
FIG. 1 is a schematic view illustrating a conventional wireless charging device and an electronic device.
Figure 2:
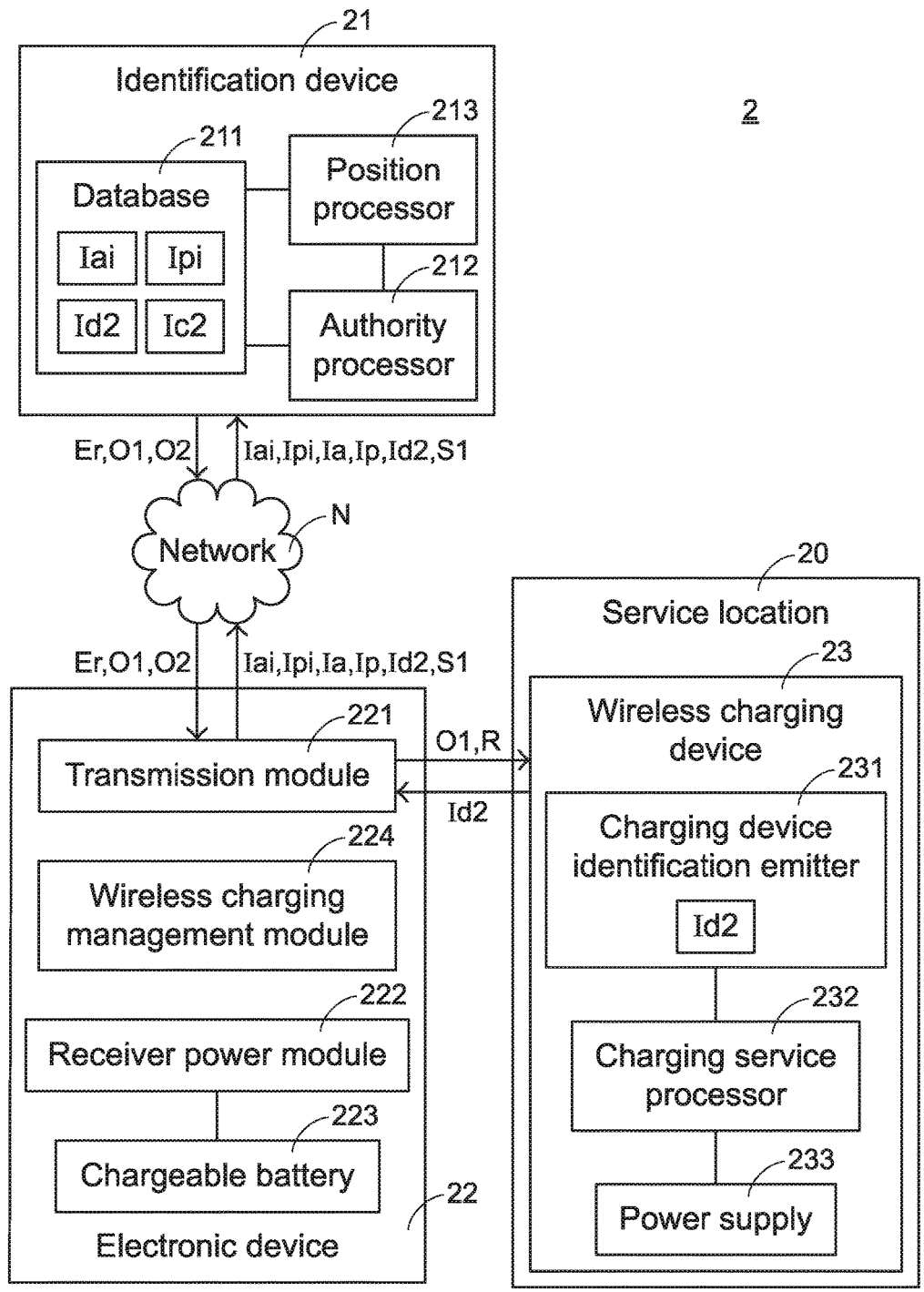
FIG. 2 is a schematic block diagram illustrating a wireless charging service system according to a first embodiment of the present invention.

For solving the problems of the conventional technologies, the present invention provides a wireless charging service method and a wireless charging device. First of all, the structure of the wireless charging device for implementing the method of the present invention will be described. FIG. 2 is a schematic block diagram illustrating a wireless charging service system according to a first embodiment of the present invention. The wireless charging service system 2 comprises an identification device 21, an electronic device 22 and a wireless charging device 23. The identification device 21 is installed in a network N. The identification device 21 comprises a database 211. The database 211 at least stores an account identification information Iai and a password identification information Ipi. The account identification information Iai and the password identification information Ipi are defined as login identification information. The electronic device 22 comprises a transmission module 221, a receiver power module 222, a chargeable battery 223 and a wireless charging management module 224. The electronic device 22 is connected with the identification device 21 and the wireless charging device 23 through the transmission module 221. The chargeable battery 223 is used for storing electric power. Moreover, the chargeable battery 223 can provide electric power for powering the electronic device 22. The wireless charging management module 224 is installed in the electronic device 22. Moreover, the wireless charging management module 224 provides a login interface 225 and an operation interface 226 for allowing the user to perform associated operations. These operations will be described later.

In a preferred embodiment, the identification device 21 is a network server. The network N comprises a mobile phone network (e.g., a 3G network or a LTE network), a public network (e.g., the internet), a local area network (LAN), a wide area network (WAN), and so on. Preferably but not exclusively, the electronic device 22 is a smart phone. In another embodiment, the electronic device is a notebook computer, a tablet computer, a personal digital assistant, a handheld game console, a digital camera, a digital video camera, an electric vehicle, an electric motorcycle, or the like.

As shown in FIG. 2, the wireless charging device 23 is installed in a service location 20. For example, the service location 20 is a convenience store, an airport, a station, a gas station, a shopping mall, or the like. When the electronic device 22 is close to the wireless charging device 23, the wireless charging device 23 is in wireless communication with the electronic device 22. The wireless charging device 23 provides electric power to wirelessly charge the electronic device 22 according to a wireless charging technology. The wireless charging device 23 comprises a charging device identification emitter 231, a charging service processor 232 and a power supply 233. The charging device identification emitter 231 has a predetermined charging device information Id2. Moreover, the charging device identification emitter 231 periodically issues the charging device information Id2. During the operation of the electronic device 22, the electronic device 22 issues an authority information O1. According to the authority information O1 from the electronic device 22, the charging service processor 232 determines whether a charging service is provided to the electronic device 22. The power supply 223 is connected with the charging service processor 232. When the charging service processor 232 provides the charging service, the power supply 223 performs a wireless charging operation on the electronic device 22. In addition to the database 211, the identification device 21 further comprises an authority processor 212 and a position processor 213. The functions and operations of the authority processor 212 and the position processor 213 will be described in more details later.

In this embodiment, the charging device identification emitter 231 issues the charging device information Id2 to the electronic device 22 through a network connection channel. The charging service processor 232 receives the authority information O1 from the electronic device 22 through the network connection channel. The power supply 233 wirelessly charges the electronic device 22 through a power transmission channel. The network connection channel includes at least one of a Wi-Fi network, a personal area network (e.g., Bluetooth or Zibee) and a wireless power sensing communication channel. The power transmission channel includes at least one of an electromagnetic induction wireless charging channel and an electromagnetic resonance wireless charging channel. That is, the power supply 233 includes at least one of an electromagnetic induction wireless charger (e.g., WPC Qi) and an electromagnetic resonance wireless charger (e.g., A4WP Rezence).

Moreover, the account identification information Iai and the password identification information Ipi stored in the database 211 are previously provided by the user during the registering process of the wireless charging management module 224. When the electronic device 22 logins into the identification device 21, the identification device 21 judges whether the electronic device 22 is authenticated according to the account identification information Iai and the password identification information Ipi.

Figure 3:
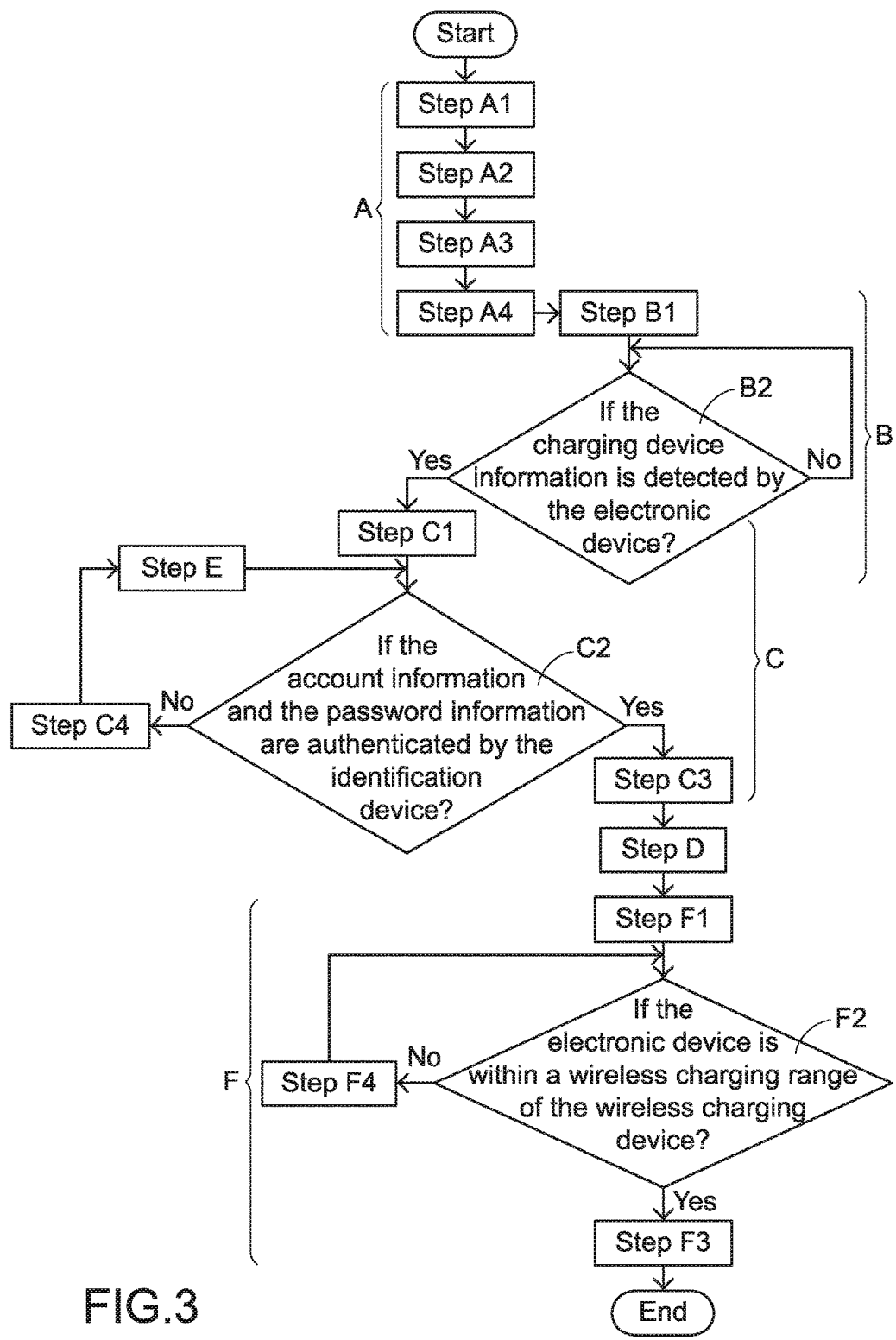
FIG. 3 is a flowchart illustrating a wireless charging service method according to the first embodiment of the present invention.

The wireless charging service method will be described in more details as follows. Please refer to FIGS. 2 and 3. FIG. 3 is a flowchart illustrating a wireless charging service method according to the first embodiment of the present invention. The wireless charging service method of the present invention comprises the following steps.

In a step A, the database of the identification device is created.

In a step B, the wireless charging device periodically issues a charging device information to the electronic device.

In a step C, the identification device judges whether the electronic device is authenticated.

In a step D, the identification device issues an authority information and a position information to the electronic device.

In a step E, another login information from the electronic device is waited.

In a step F, the wireless charging device receives the authority information from the electronic device, and the wireless charging device performs a wireless charging operation on the electronic device.

The step A comprises the following steps.

In a step A1, a login identification information corresponding to the electronic device is stored in the database by the identification device.

In a step A2, a charging device information corresponding to the wireless charging device is stored in the database by the identification device.

In a step A3, a position information corresponding to the service location is stored in the database by the identification device.

In a step A4, the connection between the charging device information and the position information is established, wherein the login identification information contains an account identification information and a password identification information.

The step B comprises the following steps.

In a step B1, the wireless charging device periodically issues a charging device information.

In a step B2, the electronic device judges whether the charging device information from the wireless charging device is detected. If the electronic device judges that the charging device information is not detected, the step B2 is performed again. Whereas, if the electronic device judges that the charging device information is detected, the electronic device requests the user to input the login information.

The step C comprises the following steps.

In a step C1, the identification device receives the login information from the electronic device.

In a step C2, the identification device judges whether the login information matches the login identification information.

In a step C3, the identification device judges that the electronic device is authenticated and issues the authority information to the electronic device.

In a step C4, the identification device judges that the electronic device is not authenticated and issues a login failure information to the electronic device.

The step F comprises the following steps.

In a step F1, the wireless charging device receives the authority information from the electronic device.

In a step F2, the wireless charging device judges whether the electronic device is within a wireless charging range.

In a step F3, the wireless charging device performs the wireless charging operation on the electronic device.

In a step F4, the wireless charging device provides an approaching prompt information to the electronic device.

If the identification device judges that the login information matches the login identification information in the step C2, the step C3 is performed. Whereas, if the identification device judges that the login information does not match the login identification information in the step C2, the step C4 is performed. After the step E, the step C2 is repeatedly done. The rest may be deduced by analogy. If the wireless charging device judges that the electronic device is within the wireless charging range in the step F2, the step F3 is performed. Whereas, if the wireless charging device judges that the electronic device is not within the wireless charging range in the step F2, the step F4 is performed. After the step F4, the step F2 is repeatedly done. The rest may be deduced by analogy.

Hereinafter, the operations of the wireless charging service method implemented by the wireless charging service system 2 will be illustrated with reference to FIGS. 2 and 3. Firstly, the identification device 21 performs the step A1. Consequently, the login identification information corresponding to the electronic device 22 is stored in the database 211. The login identification information contains the account identification information Iai and the password identification information Ipi. Then, the charging device information Id2 corresponding to plural wireless charging devices 23 will be stored in the database 211. That is, the step A2 is performed. Then, the step A3 is performed. Consequently, the position information Ic2 corresponding to the service locations 20 of the plural wireless charging devices 23 will be stored in the database 211. After the charging device information Id2 and the position information Ic2 are stored in the database 211, the identification device 21 performs the step A4. Consequently, the connection between the charging device information Id2 and the corresponding position information Ic2 is established. It is noted that the sequence of the step A1, the step A2 and the step A3 is not restricted. However, the step A4 is performed after the step A2 and the step A3 are completed.

After the step A is completed, the user goes out while carrying the electronic device 22 and using the electronic device 22. In this embodiment, the user has known the position of the service location 20 and realized that the service location 20 is equipped with the wireless charging device 23. If the electric quantity of the electronic device 22 is insufficient and the electronic device 22 needs to be charged, the user may go to the nearby service location 20 and approach the wireless charging device 23 in the service location 20. Moreover, the charging device identification emitter 231 of the wireless charging device 23 issues the charging device information Id2 at a predetermined time interval (i.e., periodically). According to the charging device information Id2, the electronic device 22 near the wireless charging device 23 detects the presence of the wireless charging device 23. That is, the wireless charging device 23 performs the step B1. If the electronic device 22 does not detect any wireless charging device in the step B2, the electronic device 22 performs the step B2 again after a predetermined time period. Whereas, if the electronic device 22 judges that the charging device information is detected in the step B2, the electronic device 22 requests the user to input the login information and then the step C is performed.

Figure 4:
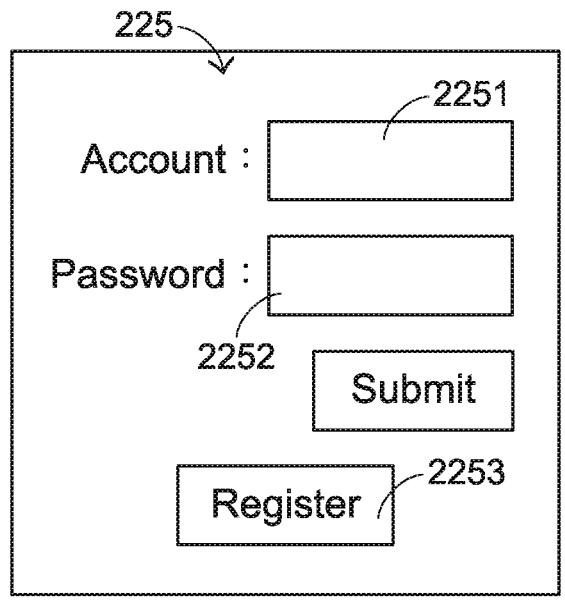
FIG. 4 is a schematic block diagram illustrating the login interface of the wireless charging service system according to the first embodiment of the present invention.

Please refer to FIGS. 2 to 4. FIG. 4 is a schematic block diagram illustrating the login interface of the wireless charging service system according to the first embodiment of the present invention. After the electronic device 22 receives the charging device information Id2 from the wireless charging device 23, the user may enable the wireless charging management module 224 of the electronic device 22. Consequently, a login interface 225 is shown on the electronic device 22. The login interface 225 comprises an account information input field 2251, a password information input field 2252 and a registering item 2253. The user may input the previously-registered account information Ia into the account information input field 2251. Similarly, the password information Ip corresponding to the account information Ia may be inputted into the password information input field 2252 by the user. The account information Ia and the password information Ip are defined as the login information. When the registering item 2253 is clicked by the user, the registering process of the wireless charging management module 224 is performed.

It is noted that the account identification information Iai and the consuming behavior in the service location 20 are correlated with each other to generate a corresponding reward point. For example, in a convenience store, the manufacturer owning the wireless charging service system 2 can make an agreement with the convenience store manufacturer in advance. According to the agreement, the spending amount of the user corresponding to the account identification information Iai in the convenience store results in discount points. For example, every NT$50 of spending amount results in one discount point. These discount points are linked with the account identification information Iai and recorded in the database 211 of the identification device 21.

Then, in the step C1, the user activates the wireless charging management module 224 in order to input the account information Ia and the password information Ip to the login interface 225. Consequently, the account information Ia and the password information Ip are transmitted from the transmission module 221 of the electronic device 22 to the identification device 21 through the network N. That is, the login action for the identification device 21 is performed. After the identification device 21 receives the account information Ia and the password information Ip, the identification device 21 performs the step C2. That is, the identification device judges whether the account information Ia is identical to the account identification information Iai and judges whether the password information Ip is identical to the password identification information Ipi.

After the authority processor 212 of the identification device 21 receives the account information Ia in the step C2, the authority processor 212 judges whether any account identification information Iai identical to the account information Ia is contained in the database 211. If no account identification information Iai identical to the account information Ia is searched from the database 211, the authority processor 212 judges that the account information Ia is different from the account identification information Iai. If the account identification information Iai matching the account information Ia is searched from the database 211, the authority processor 212 further judges whether the password information Ip is identical to the password identification information Ipi corresponding to the account information Ia. If the authority processor 212 judges that the password information Ip is different from the password identification information Ipi, the authority processor 212 performs the step C4. Meanwhile, the authority processor 212 judges that the electronic device 22 is not authenticated. In addition, the authority processor 212 issues a login failure information Er to the electronic device 22 to prompt the user that the account information Ia or the password information Ip corresponding to this input action is erroneous. Then, the authority processor 212 performs the step E of waiting for receiving another account information and another password information from the electronic device 22. Whereas, if the identification device 21 judges that the password information Ip is identical to the password identification information Ipi, the identification device 21 performs the step C3. That is, the identification device 21 judges that the electronic device 22 is authenticated.

The step C3 is performed by the position processor 213 of the identification device 21. The procedure of the step C3 will be described as follows in more details. Firstly, according to the charging device information Id2 from the electronic device 22, the identification device 21 searches the position information Ic2 corresponding to the charging device information Id2 from the database 211 of the identification device 21. Consequently, the position processor 213 realizes that the electronic device 22 is in the service location 20 and the wireless charging device 23 is detected. At the same time, the position processor 213 searches the authority information O1 corresponding to the position information Ic2 from the database 211. Then, the position processor 213 performs the step D. That is, the authority information O1 and the position information Ic2 are transmitted to the electronic device 22. In an embodiment, the service location 20 is a coffee shop.

The position information Ic2 contains a first product information, a first product discount information and a first customer purchase history information corresponding to the provider of the wireless charging device 23. For example, the first product information is the information related to the provider's products, the first product discount information is the information about the coupons of the wireless charging device and related products, and the first customer purchase history information is the information about the purchase history records of the customer corresponding to the login information in the provider of the wireless charging device 23. Preferably, the position information Ic2 further contains the following information: a second product information, a second product discount information and a second customer purchase history information corresponding to the provider of the service location 20 of the wireless charging device 23. For example, the second product information is the information about coffee, coffee appliances and related products, the second product discount information is the information about the coffee coupon of the coffee shop, and the second customer purchase history information is the information about the purchase history records of the customer corresponding to the login information in the provider of the service location 20 (i.e., the coffee shop).

At the time when the electronic device receives the authority information O1, the wireless charging management module 224 enters an operation interface 226. The authority information O1 contains the quota information about the chargeable quota. Moreover, the chargeable quota is purchased by the user from the store owner or determined according to the reward point corresponding to the account identification information Iai.

Figure 5:
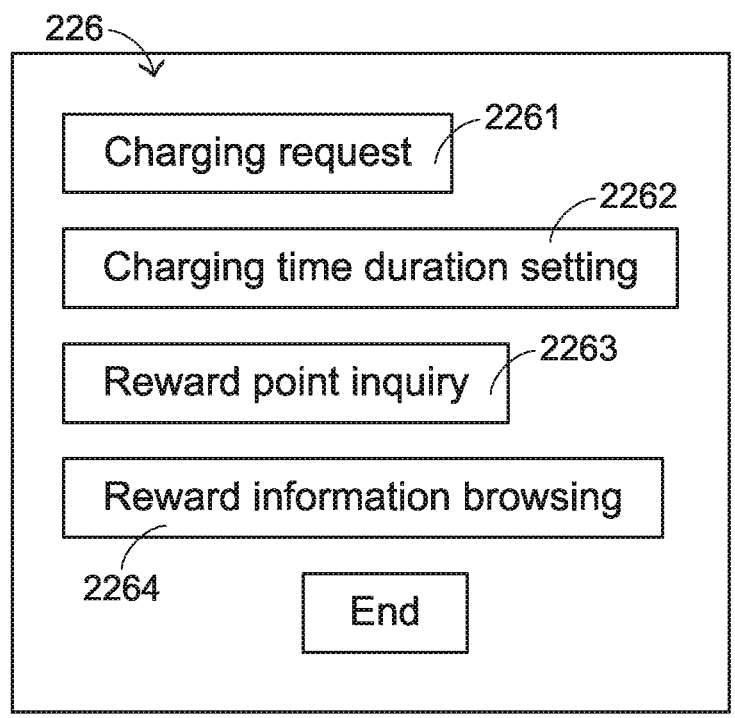
FIG. 5 is a schematic block diagram illustrating an operation interface of the wireless charging service system according to the first embodiment of the present invention.

FIG. 5 is a schematic block diagram illustrating an operation interface of the wireless charging service system according to the first embodiment of the present invention. The operation interface 226 comprises a charging request item 2261, a charging time duration item 2262, a reward point inquiry item 2263 and a reward information browsing item 2264. When the charging request item 2261 is clicked by the user, the electronic device 22 issues the authority information O1 to the wireless charging device 23. When the charging time duration item 2262 is clicked, two functions are provided. Firstly, the user can inquire about the chargeable quota contained in the authority information O1. Secondly, the user can set the chargeable quota, and thus the electronic device 22 issues a corresponding setting signal S1 to the identification device 21. Consequently, the electronic device 22 acquires another authority information O2 corresponding to the setting signal S1.

When the reward point inquiry item 2263 is clicked, the electronic device 22 is connected to the identification device 21. Consequently, the user can inquire about the residual reward points. Of course, if the residual reward points are insufficient but the charging demand is required, the user may acquire another authority information through the charging time duration item 2262. However, the user has to pay the charging fee about the insufficient reward points. The way of paying the charging fee includes swiping a credit card, deduction through a value storage platform or account transfer. Moreover, when the reward information browsing item 2264 is clicked, the received reward information is shown to be viewed and used by the user. Since the position information Ic2 of the service location 20 is transmitted to the electronic device 22 to be viewed by the user, this wireless charging service system can be used as one of the marketing strategies of the service location 20.

After the electronic device 22 receives the authority information O1, the user may click the charging request item 2261. Consequently, the electronic device 22 is controlled to output the authority information O1 to the wireless charging device 23. According to the authority information O1, the wireless charging device 23 is requested to perform the wireless charging operation. That is, the step F1 is performed. Then, according to the authority information O1, the wireless charging device 23 judges whether the electronic device 22 is within a wireless charging range of the wireless charging device 23. That is, the step F2 is performed. If the wireless charging device 23 judges that the electronic device 22 is within the wireless charging range, the step F3 is performed. That is, according to the quota information of the authority information O1, the wireless charging device 23 continuously performs the wireless charging operation corresponding to the chargeable quota. Whereas, if the the wireless charging device 23 judges that the electronic device 22 is not within the wireless charging range, the step F4 is performed. Meanwhile, the wireless charging device 23 provides an approaching prompt information R to the electronic device 22 in order to notify the user to move the electronic device 22 to the wireless charging range.

Preferably but not exclusively, the chargeable quota is calculated according to the consumed electricity quantity (e.g., the consumed watts) of the wireless charging device. In another embodiment, the authority information contains the time duration information corresponding to the chargeable time. Consequently, the calculated unit of the output electric power is expressed as the operation time length.

In another embodiment, the authority information does not contain the quota information. Under this circumstance, another method is provided to calculate the chargeable quota. For example, in case that the authority information received by the wireless charging device does not contain the quota information, the wireless charging device still performs the wireless charging operation on the electronic device according to the authority information. After the wireless charging operation on the electronic device is completed, the wireless charging device calculates a total charge quota in this charging cycle. According to the total charge quota, a charge payment information is generated. According to the charge payment information, the user may pay the charging fee.

In accordance with the wireless charging service method of the above embodiment, the identification device 21 issues the authority information and the position information to the electronic device after the electronic device 22 is authenticated. It is noted that numerous modifications and alterations may be made while retaining the teachings of the invention. For example, the wireless charging service method may be modified to enhance the publicizing and marketing efficacy. Regardless of whether the electronic device is authenticated, the identification device issues the position information to the electronic device. Even if the electronic device is not authenticated, the electronic device can still receive the position information. Since the number of persons receiving the position information increases, the publicizing and marketing efficacy is enhanced. That is, the electronic device capable of receiving the position information through the method of the present invention is not restricted to the authenticated electronic device.

From the above descriptions, the user can operate the wireless charging service method of the present invention to control the wireless charging device 23 to wirelessly charge the electronic device 22. If the chargeable quota for performing the wireless charging operation is used up but it is necessary to continuously perform the wireless charging operation, the use may click the charging time duration item 2262 issues the corresponding setting signal S1 to the identification device 21. Consequently, the electronic device 22 acquires another authority information O2 corresponding to the setting signal S1. Meanwhile, the number of the residual reward points is reduced. Consequently, the user can control the length of the wireless charging operation according to the practical requirements. Moreover, after the electronic device receives the charging device information from the wireless charging device, the electronic device issues the login information and the charging device information to the identification device so as to be authenticated. In other words, the identification device can realize the position of the electronic device according to the charging device information. The identification device not only issues the authority information to the electronic device but issues the position information of the service location to the electronic device. Consequently, the publicizing and marketing efficacy is enhanced.

Figure 6:
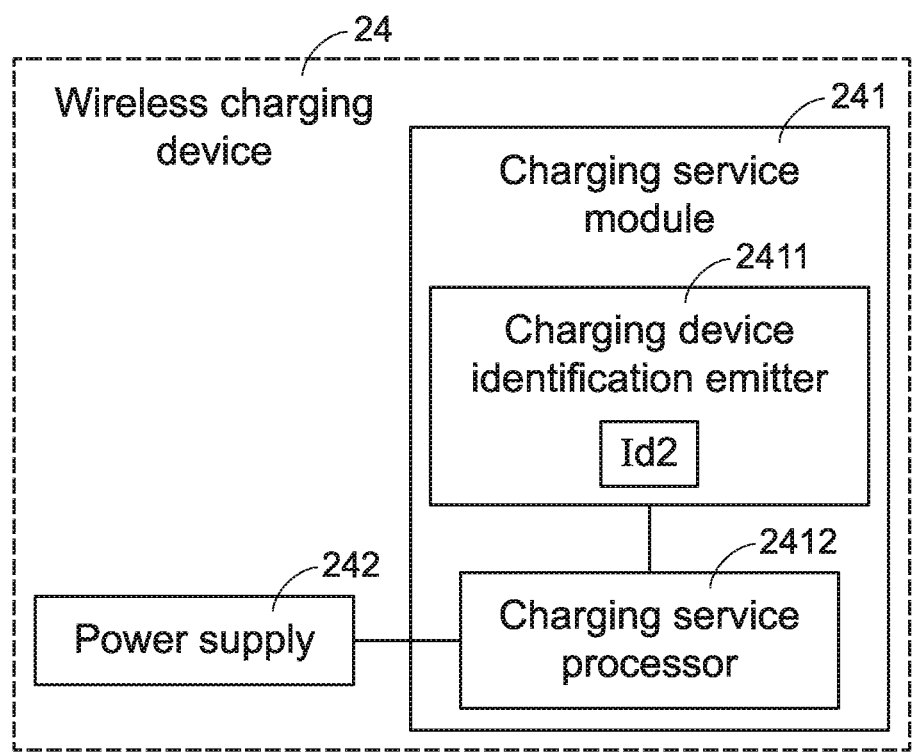
FIG. 6 is a schematic block diagram illustrating a wireless charging device according to a second embodiment of the present invention.

The present invention further provides a variant example of the wireless charging device. FIG. 6 is a schematic block diagram illustrating a wireless charging device according to a second embodiment of the present invention. As shown in FIG. 6, the wireless charging device 24 comprises a charging service module 241 and a power supply 242. The charging service module 241 is used for performing the wireless charging service method of the present invention. The power supply 242 is used for providing electric power. The charging service module 241 comprises a charging device identification emitter 2411 and a charging service processor 2412. The operations of the charging device identification emitter 2411 and the charging service processor 2412 are similar to those of the first embodiment, and are not redundantly described herein. In comparison with the first embodiment, the charging service module 241 and the power supply 242 are separate components and not integrated into the wireless charging device. The wireless charging device has the following benefits. For example, the charging service module 241 is for performing the wireless charging service method of the present invention and the existing power supply 242 are combined together to produce the wireless charging device 24. Since it is not necessary to integrate the charging service module 241 with the power supply 242, the fabricating cost is reduced.

Figure 7:
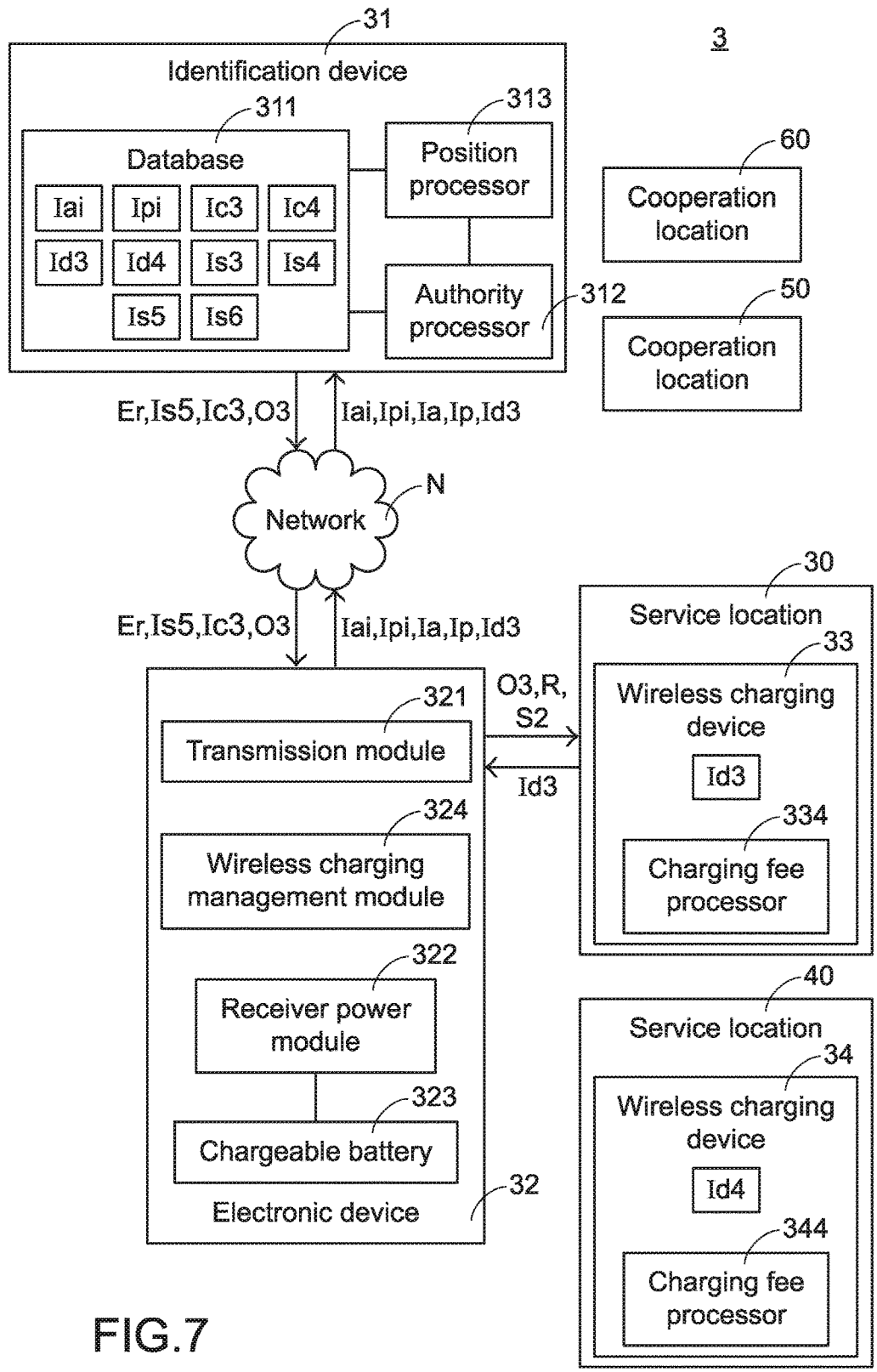
FIG. 7 is a schematic block diagram illustrating a wireless charging service system according to a third embodiment of the present invention.

The present invention further provides a third embodiment, which is distinguished from the above embodiments. FIG. 7 is a schematic block diagram illustrating a wireless charging service system according to a third embodiment of the present invention. The wireless charging service system 3 comprises an identification device 31, an electronic device 32 and plural wireless charging devices 33 and 34. The identification device 31 is installed in a network N. The identification device 31 comprises a database 311, an authority processor 312 and a position processor 313. The database 311 at least stores an account identification information Iai and a password identification information Ipi corresponding to the electronic device 32, a charging device information Id3 corresponding to the wireless charging device 33, a charging device information Id4 corresponding to the wireless charging device 34, a service location information Is3 corresponding to the wireless charging device 33, a service location information Is4 corresponding to the wireless charging device 34, a position information Ic3 corresponding to the service location information Is3, a position information Ic4 corresponding to the service location information Is4, a cooperation location information Is5 of a cooperation location 50 having a commercial cooperative relationship with the identification device 31, and a cooperation location information Is5 of a cooperation location 60 having a commercial cooperative relationship with the identification device 31. In an embodiment, the charging device information Id3 is a charging device identification tag corresponding to the wireless charging device 33, and the charging device information Id4 is a charging device identification tag corresponding to the wireless charging device 34. In another embodiment, the charging device information is a position coordinate information about the position of the wireless charging device. The electronic device 32 comprises a transmission module 321, a receiver power module 322, a chargeable battery 323 and a wireless charging management module 324. The electronic device 32 is connected with the identification device 31 and the wireless charging devices 33 and 34 through the transmission module 321. The wireless charging management module 324 is installed in the electronic device 32. Moreover, the wireless charging management module 324 provides a login interface (not shown) and an operation interface 322 for allowing the user to perform associated operations. The wireless charging devices 33 and 34 are installed in different service locations 30 and 40, respectively. When the electronic device 32 is close to the wireless charging device 33 or 34, the wireless charging device 33 or 34 is in wireless communication with the electronic device 32. The wireless charging device 33 or 34 provides electric power to wireless charge the electronic device 22 according to a wireless charging technology. Each of the wireless charging devices 33 and 34 comprises a charging device identification emitter (not shown), a charging service processor (not shown) and a power supply (not shown). The structures of the above components are similar to those of the first embodiment, and are not redundantly described and not shown in the drawings. As shown in FIG. 7, the wireless charging device 33 corresponds to the charging device information Id3, and the wireless charging device 34 corresponds to the charging device information Id4.

Except for the following aspects, the architecture of the wireless charging service system 3 of this embodiment is similar to that of the wireless charging service system 2 of the first embodiment. For example, the wireless charging devices 33 and 34 further comprise charging fee processors 334 and 344, respectively. Each of the charging fee processors 334 and 344 calculates a charge amount information according to the operation of the power supply and calculates a fee collecting information according to the charge amount information. In other words, the authority information O3 generated by the authority processor 312 does not contain the quota information corresponding to the chargeable quota and the time duration information corresponding to the chargeable time, which will be described in more details later.

Figure 8:
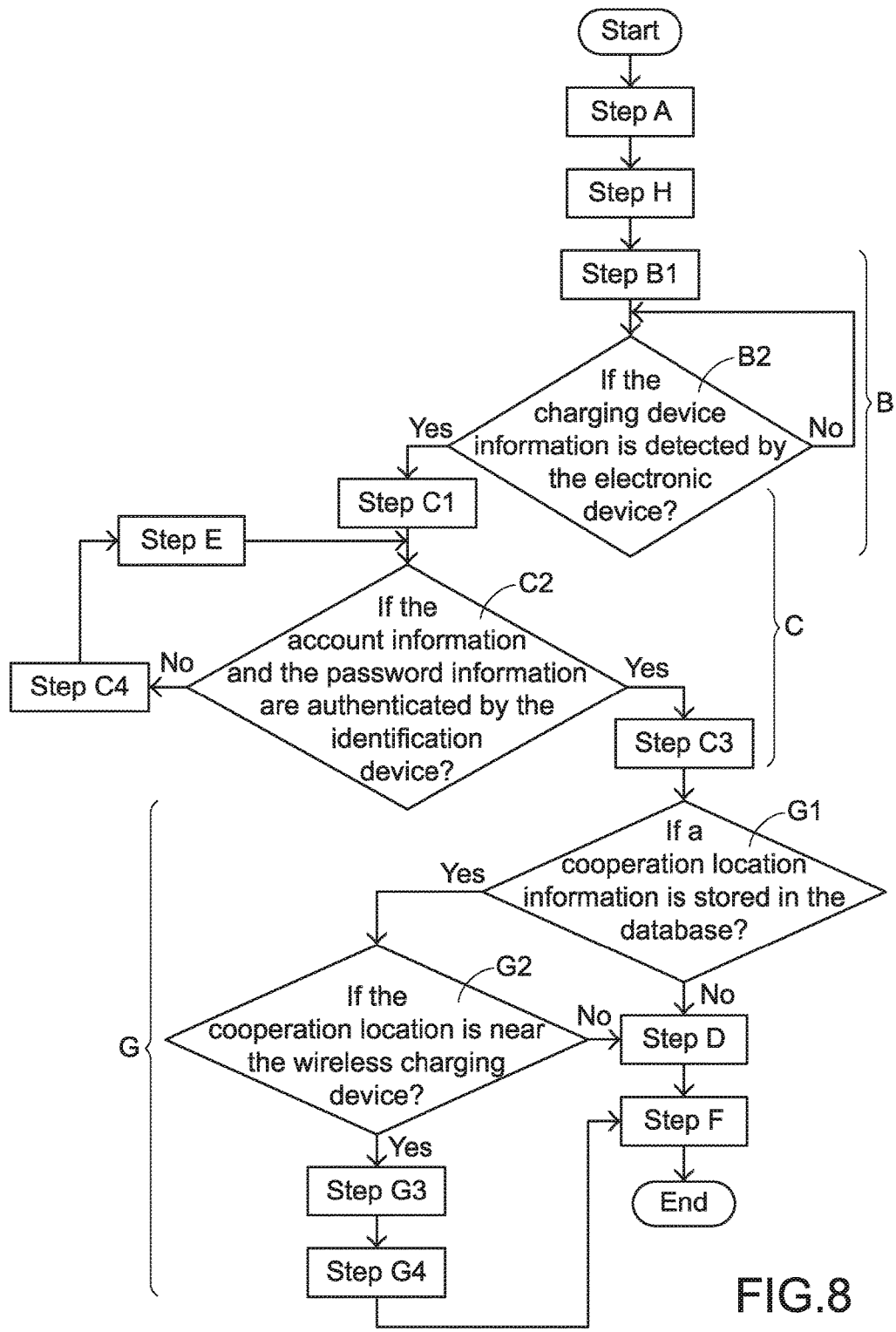
FIG. 8 is a flowchart illustrating a wireless charging service method according to a third first embodiment of the present invention.

The wireless charging service method will be described in more details as follows. Please refer to FIGS. 7 and 8. FIG. 8 is a flowchart illustrating a wireless charging service method according to a third first embodiment of the present invention. The wireless charging service method of the present invention comprises the following steps.

In a step A, the database of the identification device is created.

In a step H, a cooperation location information is stored in the database.

In a step B, the wireless charging device periodically issues a charging device information.

In a step C, the identification device judges whether the electronic device is authenticated.

In a step D, the identification device issues an authority information and a position information to the electronic device.

In a step E, another login information and another password information from the electronic device are waited.

In a step F, the wireless charging device receives the authority information from the electronic device, and the wireless charging device performs a wireless charging operation on the electronic device.

In a step G, the identification device searches a nearby cooperation location according to the charging device information and transmits the position information of the cooperation location to the electronic device.

The step G comprises the following steps.

In a step G1, the identification device judges whether a cooperation location information is stored in the database.

In a step G2, the identification device judges whether a position corresponding to the cooperation location information is near the wireless charging device.

In a step G3, the identification device selects the cooperation location information near the wireless charging device.

In a step G4, the identification device issues the selected cooperation location information, the authority information and the position information to the electronic device.

If the identification device judges that no cooperation location information is stored in the database in the step G1, the step D is performed. Whereas, if the judging condition of the step G1 is not satisfied, the step G2 is performed. If the identification device judges that the position corresponding to the cooperation location information is near the wireless charging device in the step G2, the step G3 is performed. Whereas, if the judging condition of the step G2 is not satisfied, the step D is performed. After the step G4 is completed, the step F is performed. The operations of the steps A~F are similar to those of the first embodiment, and are not redundantly described herein.

Hereinafter, the operations of the wireless charging service method implemented by the wireless charging service system 3 will be illustrated with reference to FIGS. 7 and 8. Firstly, the identification device 31 performs the step A, which is identical to the step A of the first embodiment. Consequently, the charging device information Id3 corresponding to the wireless charging device 33, the charging device information Id4 corresponding to the wireless charging device 34, the position information Ic3 corresponding to the service location 30 of the wireless charging device 33 and the position information Ic4 corresponding to the service location 40 of the wireless charging device 34 are stored in the database 311. The charging device information Id3 is stored in the database 311 when the wireless charging device 33 is in the service location 30 and the charging device information Id3 is transmitted to the database 311. The way of storing the charging device information Id4 is similar. After the charging device information Id3, the charging device information Id4, the position information Ic3 and the position information Ic4 are stored in the database 311, the connection between the charging device information Id3 and the corresponding position information Ic3 is established and the connection between the charging device information Id4 and the corresponding position information Ic4 is established.

After the step A is completed, the step H is performed to store the cooperation location information Is5 and the cooperation location information Is6 in the database 311. Moreover, since each of the charging device information Id3, the charging device information Id4, the cooperation location information Is5 and the cooperation location information Is6 in the database 311 contains the position coordinate information of the position, the identification device 31 can realize the relative position relationships between the wireless charging devices 33, 34, the service locations 30, 40 and the cooperation locations 50, 60 according to the charging device information Id3, the charging device information Id4, the cooperation location information Is5 and the cooperation location information Is6.

After the step H is completed, the user goes out while carrying the electronic device 32 and using the electronic device 32. If the electric quantity of the electronic device 32 is insufficient and the electronic device 32 needs to be charged, the user may go to the nearby service location 30 and approach the wireless charging device 33 in the service location 30. Then, the subsequent steps B and C are performed. The operations of the steps B and C are similar to those of the first embodiment, and are not redundantly described herein.

After the authority processor 312 judges that the electronic device 32 is authenticated in the step C3, the position processor 313 performs the step G1 of judging whether a cooperation location information is stored in the database 311. Since the cooperation location information Is5 and the cooperation location information Is6 are stored in the database 311, the step G2 is performed or otherwise the step D is performed. In the step G2, the position processor 313 searches all cooperation location information in the database 311 and sequentially judges whether the position corresponding to the cooperation location information is near the wireless charging device corresponding to the charging device information. The judging result of the step G2 indicates that the position corresponding to the cooperation location information Is5 is near the wireless charging device 33. If the judging result of the step G2 indicates that no cooperation location information is detected, the step D is performed. Then, the position processor 313 performs the step G3 of selecting the cooperation location information Is5 and performs the step G4 of issuing the selected cooperation location information Is5, the authority information O3 and the position information Ic3 to the electronic device 32. In this embodiment, the authority information O3 contains an enabling signal.

In an embodiment, the service location 30 is a convenience store, and the position information Ic3 is the information about the coupons of the convenience store. In another embodiment, the position information Ic3 contains the discount information to be provided in the future or contains the information about the introduction of other reward activities in the convenience store. Consequently, the publicizing and advertising purpose is achieved.

Figure 9:
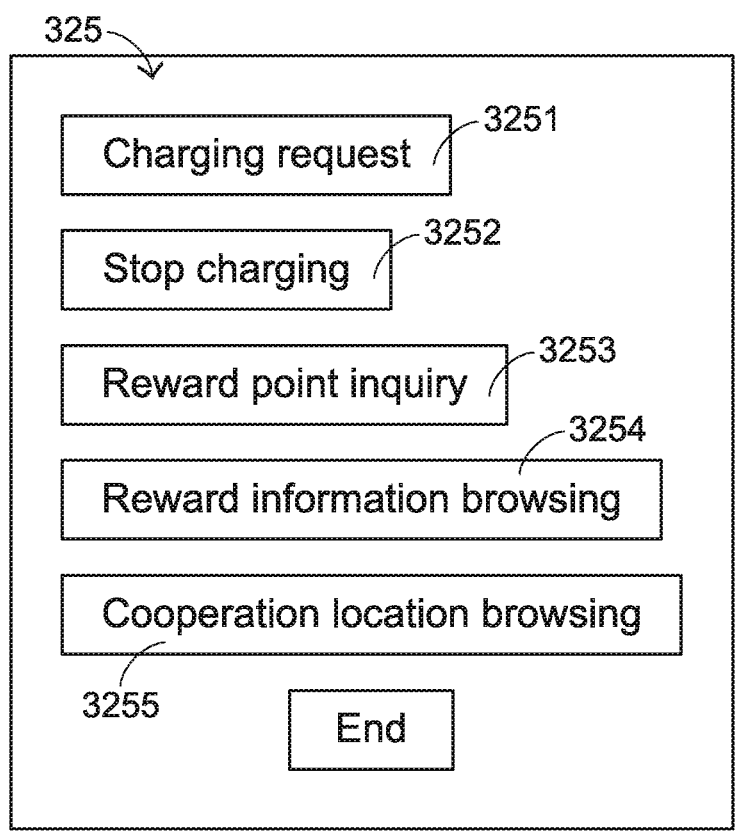
FIG. 9 is a schematic block diagram illustrating an operation interface of the wireless charging service system according to the third embodiment of the present invention.

At the time when the electronic device receives the authority information O3, the wireless charging management module 324 enters an operation interface 325. The contents of the operation interface 325 are shown in FIG. 9. FIG. 9 is a schematic block diagram illustrating an operation interface of the wireless charging service system according to the third embodiment of the present invention. The operation interface 325 comprises a charging request item 3251, a stop charging item 3252, a reward point inquiry item 3253, a reward information browsing item 3254 and a cooperation location browsing item 3255. The functions of the charging request item 3251, the reward point inquiry item 3253 and the reward information browsing item 3254 are similar to those of the first embodiment, and are not redundantly described herein. When the stop charging item 3252 is triggered by the user, the electronic device 32 issues a disabling signal S2 to the wireless charging device 33. In response to the disabling signal S2, the wireless charging operation performed by the wireless charging device 33 is stopped. When the cooperation location browsing item 3255 is clicked, the received cooperation location information Is5 is shown. Consequently, the user can view the cooperation location information Is5 to realize the position of the cooperation location 50. In another embodiment, the cooperation location information Is5 contains the information about the introduction of the reward activities or the reward information about the cooperation location 50. Consequently, the advertising efficacy is further increased.

Afterwards, the step F similar to the first embodiment is performed. Consequently, the wireless charging operation is performed. As mentioned above, the authority information O3 contains the enabling signal. When the wireless charging device 33 receives the authority information O3 from the electronic device 32 and the step F is completed, the power supply is enabled to wirelessly charge the electronic device 32 in response to the enabling signal. At the time when the wireless charging operation is performed, the charging fee processor 334 calculates the time duration of the wireless charging operation or the total charge amount that is consumed by the power supply. If the user thinks that the electric power acquired by the electronic device 32 is sufficient and it is not necessary to perform the wireless charging operation, the user may click the stop charging item 3252 to issue the disabling signal S2 to the wireless charging device 33. In response to the disabling signal S2, the wireless charging device 33 stops performing the wireless charging operation on the electronic device 32. At the time when the wireless charging operation is stopped, the charging fee processor 334 records the total charge time or the total charge amount. Moreover, the charging fee processor 334 calculates a fee collecting information corresponding to the time duration of the wireless charging operation according to the total charge time or the total charge amount. In the above situations, the wireless charging service method of the present invention is performed without the quota information and the time duration information.

In an embodiment, the position information Ic3 contains a first product information, a first product discount information and a first customer purchase history information corresponding to the provider of the wireless charging device 33, and a second product information, a second product discount information and a second customer purchase history information corresponding to the provider of the service location 30 of the wireless charging device 33. Moreover, the position information Ic3 further contains a third product information, a third product discount information and a third customer purchase history information.

Moreover, the charging device information from the charging device identification emitter further contains a charging device tag and a signal strength reference value. When the electronic device receives the charging device information, the electronic device realizes the position of the wireless charging device according to the charging device tag. Moreover, the electronic device realizes the distance between the electronic device and the wireless charging device according to the signal strength reference value. According to the charging device tag and a signal strength reference value, the electronic device establishes the map around the electronic device and the wireless charging device and generates a relative position and a traveling path between the electronic device and the wireless charging device. In other words, the electronic device has the navigation function.

From the above descriptions, the wireless charging service method of the present invention is capable of controlling the wireless charging device 33 to wirelessly charge the electronic device 32. Moreover, the identification device 31 issues the position information Ic3 corresponding to the position of the service location 30 where the electronic device 32 is located. Since the position information Ic3 is used by the user, the publicizing and advertising purpose is achieved Moreover, the charging fee processor of this embodiment and the charging service module of the second embodiment are combined together. The charging service module and the power supply are separate components to produce the wireless charging device. Moreover, the charging fee processor calculates the total charge time of the power supply or the total charge amount consumed by the power supply in order to acquire the corresponding fee collecting information. The operations of this wireless charging device are similar to those of the third embodiment, and are not redundantly described herein.

From the above descriptions, the present invention provides a wireless charging service method. The task of authenticating the electronic device is performed through the identification device in the network. Consequently, the structure of the wireless charging device is simplified. In other words, the wireless charging device is only responsible for the wireless charging task, and the wireless charging device does not need to perform the task of authenticating the electronic device. The task of authenticating the electronic device is related to the electronic device and the identification device only. Since the account information, the password information and associated private information of the electronic device are not transmitted to the public wireless charging device, the private information will not be leaked. Moreover, after the electronic device receives the charging device information from the wireless charging device, the electronic device realizes the position of the electronic device according to the charging device information. In other words, the identification device can provide the current position of the electronic device or the position information of the nearby position to the electronic device. Consequently, the publicizing and marketing efficacy of the service location and the cooperation location will be enhanced.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. A wireless charging service method, comprising steps of:
   an electronic device receiving a charging device information from a wireless charging device, and issuing the charging device information and a login information to an identification device;
   the identification device judging whether the electronic device is authenticated according to the login information, wherein if the identification device judges that the electronic device is authenticated, the identification device issues an authority information to the electronic device;
   issuing a position information corresponding to the charging device information from the identification device to the electronic device; and
   the wireless charging device receiving the authority information from the electronic device, and performing a wireless charging operation on the electronic device.

2. The wireless charging service method according to claim 1, wherein before the electronic device issues the charging device information and the login information to the identification device, the wireless charging service method further comprises steps of:
   allowing a login identification information corresponding to the electronic device to be stored in a database by the identification device;
   allowing the charging device information corresponding to the wireless charging device to be stored in the database by the identification device;
   allowing the position information corresponding to a service location to be stored in the database by the identification device; and
   establishing a connection between the charging device information and the position information.

3. The wireless charging service method according to claim 2, wherein in the step of judging whether the electronic device is authenticated according to the login information, the identification device performs steps of:
   receiving the charging device information and the logic information from the electronic device; and
   judging whether the login information matches the login identification information, wherein if the login information matches the login identification information, the identification device judges that the electronic device is authenticated and the identification device issues the authority information to the electronic device, wherein if the login information does not match the login identification information, the identification device judges that the electronic device is not authenticated and the identification device issues a login failure information to the electronic device.

4. The wireless charging service method according to claim 1, wherein the position information contains at least one of a first product information, a first product discount information and a first customer purchase history information corresponding to a provider of the wireless charging device, a second product information, a second product discount information and a second customer purchase history information corresponding to a provider of a service location of the wireless charging device, and a third product information, a third product discount information and a third customer purchase history information corresponding to a provider of a cooperation location near the service location of the wireless charging device.

5. The wireless charging service method according to claim 1, wherein while the wireless charging device receives the authority information from the electronic device and performs the wireless charging operation on the electronic device, the authority information includes at least one information selected from:
   a quota information corresponding to a chargeable quota, wherein the wireless charging device continuously performs the wireless charging operation on the electronic device according to the quota information;
   a time duration information corresponding to a chargeable time, wherein the wireless charging device continuously performs the wireless charging operation on the electronic device for a length of the chargeable time according to the time duration information; and
   an enabling signal, wherein the wireless charging device continuously performs the wireless charging operation on the electronic device in response to the enabling signal.

6. The wireless charging service method according to claim 5, wherein after the wireless charging device receives the authority information from the electronic device and performs the wireless charging operation on the electronic device, the wireless charging service method wireless charging service method further comprises steps of:
   starting to record a wireless charging enable time after the wireless charging device receives the enabling signal; and
   stopping performing the wireless charging operation on the electronic device when the wireless charging device receives a disabling signal, and recording a total charge time or a total charge amount when the wireless charging operation is stopped.

7. The wireless charging service method according to claim 1, wherein when the electronic device receives the charging device information from the wireless charging device, the electronic device generates a relative position and a traveling path between the electronic device and the wireless charging device according to a charging device tag and a signal strength reference value contained in the charging device information.

* * * * *